United States Patent [19]

Trezek et al.

[11] Patent Number: 5,060,870
[45] Date of Patent: Oct. 29, 1991

[54] POLYSTYRENE RECYCLING PROCESS

[75] Inventors: George Trezek; Martin Stanczyk; Michael Grubbs, all of Benicia, Calif.

[73] Assignee: WTE Corporation, Bedford, Mass.

[21] Appl. No.: 563,835

[22] Filed: Aug. 3, 1990

Related U.S. Application Data

[63] Continuation of Ser. No. 376,746, Jul. 7, 1989, abandoned.

[51] Int. Cl.$^5$ ............................................. B02C 23/38
[52] U.S. Cl. ..................................... 241/19; 241/21; 241/23; 241/24; 241/29; 241/46.17; 241/78; 241/79.1; 241/152 A; 241/DIG. 38
[58] Field of Search ................. 264/37, 138, DIG. 69; 162/4; 209/3, 136, 137; 241/19, 21, 24, 25, 79.1, 189 R, 46.17, 29, DIG. 38, 152 A, 78, 81, 65, 23

[56] References Cited

U.S. PATENT DOCUMENTS

| 3,848,813 | 11/1974 | Stanczyk et al. |
| 4,153,207 | 5/1979 | Cerroni ............................ 241/46.17 |
| 4,844,351 | 7/1989 | Holloway .............. 241/DIG. 38 X |
| 4,894,148 | 1/1990 | Frei ......................... 241/DIG. 38 X |

FOREIGN PATENT DOCUMENTS 3535633 4/1987 Fed. Rep. of Germany ... 241/DIG. 38

OTHER PUBLICATIONS

WTE Corporation, *Confidential Progress Report-Amoco-McDonald's Project*, Mar. 15, 1988, pp. 1-26.

Primary Examiner—Mark Rosenbaum
Attorney, Agent, or Firm—Wolf, Greenfield & Sacks

[57] ABSTRACT

The invention comprises a method and apparatus for recycling foamed polystyrene from municipal solid waste and more particularly, from fast food restaurant waste. A steady stream of waste is delivered to a flail mill for reducing particle size, a rotary trommel for eliminating undersized waste and a rotary air classifier for removing "heavy" waste from the stream. At this point, the waste stream comprises mostly paper and foamed polystyrene. The paper and foamed polystyrene are delivered to a water pulper which fiberizes the paper so that it can then be separated from the foamed polystyrene by passing it through a screen of selected mesh size to allow the water and paper pulp to pass through while retaining the foamed polystyrene.

34 Claims, 6 Drawing Sheets

POLYSTYRENE RECYCLING PROCESS

This application is a continuation of application Ser. No. 07/376,746, filed July 7, 1989, now abandoned.

1. Field of the Invention

The invention relates to a process for recycling specific materials from solid waste. More particularly, the invention relates to a process for recovering foamed polystyrene waste from fast food restaurant trash.

2. Background of the Invention

Polystyrene is a plastic material having many uses and is particularly useful, when in a foam form, as a material for making food containers. It is a significant constituent of municipal solid waste and is parcicularly prevalent in waste from fast food restaurants, cafeterias and simiilar food service establishments. Such establishments commcnly use trays, containers and cups made of polystyrene foam (PSF).

Fast food restaurant and cafeteria waste in addition to containing larqe amounts of PSF also commonly comprises a larqe proportion of paper products (such as bags, cups and napkins), wax-coated paper products, condiment containers, plastic eating utensils and food morsels.

Recycled polystyrene foam can be used to manufactu;e a wide variety of products such as plant pots, plastic desk organizers, foam construction insulation etc. and is therefore, a valuable product. Further, polystyrene foam, like most plastic, takes a very long time to degrade when placed in landfills. Therefore, it is desirable to recycle polystyrene foam to reduce the amount of such plastic in municipal landfills.

Various apparatus exist for separating recyclable materials from municipal solid waste. One such example is the process disclosed in U.S. Pat. No. 3,848,813 issued to the United States of America for a Continuous Process For Mechanically Separating Materials Contained In Urban Refuse. Most of the prior art in the area of recovering recyclable waste relates to the recovery of qlass, metals and paper from municipal solid waste. It has previously been considered unfeasable to mechanically separate PSF waste from municipal solid waste for recycling purposes. The applicants are unaware of any prior art relating to the recovery of PSF from municipal solid waste or fast food restaurant waste.

Therefore, it is an object of the present invention to provide a method and apparatus for recycling polystyrene foam from municipal solid waste and/or fast food restaurant waste.

It is a further object of the present invention to provide a method and apparatus for recovering polystyrene foam and paper pulp from municipal solid waste.

It is another object of a present invention to provide a method and apparatus for recovering polystyrene foam from waste and turning the remaining waste into pelletized refuse derived fuel.

It is yet a further object of the present invention to provide a method and apparatus for recycling waste particles having a specified fluidization velocity.

SUMMARY OF THE INVENTION

The invention comprises a method and apparatus for recovering polystyrene foam from a stream of solid waste derived from a variety of sources, but in particular from fast food restaurant and cafeteria waste. The method and apparatus disclosed herein, however, is hiqhly adaptable for recycling of other materials. The sequence of steps, arrangement of apparatus and adaptation of the method and apparatus for various types of waste is hiqhly dependent on the overall contents of the solid waste as well as the material which is to be separated and recycled. In addition, entire steps can be eliminated from the proces depending on the condition and contents of the waste. For instance, certain types of waste may be introduced into the process at an intermediate step while other types of waste which require additional separation steps may be introduced at the first staqe. Therefore, an almost infinite number of adaptations of the present invention are possible depending on the contents of the waste. The discussion below is directed towards a method and apparatus for recycling PSF from fast food restaurant waste. However, various modifications and adaptations should become obvious to a person of skill in the related arts.

Waste is delivered to the apparatus primarily in plastic garbage baqs. If the waste is from a fast food restaurant, the plastic baqs larqely contain PSF containers, paper products, plastic eating utensils and food. The present invention comprises two process lines. The primary line recovers polystyrene foam (PSF) from the stream of waste. The secondary line converts the remaining waste to densified refuse derived-fuel (d-rdf).

According to the present invention, the plastic baqs are introduced continuously into a flail mill. The flail mill comprises a chamber having rotating hammers therein for tearing open the baqs, liberating the waste within the bags, and reducing the waste particle size to a preferred range.

The waste is continuously delivered from the output of the flail mill to a rotating cylindrical trommel screen. Smaller particles of waste pass through the screen into an undersized waste receiving area, while the larger waste passes throuqh the trommel onto the next stage. The bulk of the PSF will pass throuqh to the trommel output without falling throuqh the screen. At the output of the trommel, plastic liners are manually removed from the stream of waste.

The waste is then continuously fed into an air classifier. In a preferred embodiment, the air classifier is a large rotating cylinder which uses an air stream to carry liqhter materials, such as napkins and PSF throuqh the cylinder, while the heavier waste, primarily wax coated containers and remaining food, drops out of one end of the classifier and is removed from the primary stream of waste. The liqht fraction output of the air classifier, which comprises primarily PSF and paper, is fed into a plenum chamber where the air velocity is reduced allowing the liqht fraction waste to settle to the bottom of the chamber.

The light fraction waste is then continuously delivered to a reversible conveyor which can bring the waste either to a batch pulper or a continuous pulper. Either of the pulpers essentially mixes the waste with water and vigorously agitates the mixture so as to break down the paper waste to paper pulp. The water and paper pulp is then separated from the PSF by passing the mixture through a screen which allows the water and paper pulp to pass throuqh but retains the larger PSF waste particles. The PSF is air conveyed from the screen to a qranulator. The particle size is further reduced in the qranulator. The PSF is then dried and prepared for shipment.

The paper pulp and water which passes through the screen is pumped to a static sieve where the water and paper are partially separated. The water is then recovered and recycled back into the apparatus. The paper pulp is further fed through a de-watering screw where addition 1 water is removed and recycled. The dewatered paper pulp is then collected in containers and can be sold for recycling.

The undersized waste removed in the rotating trommel and the "heavy" waste removed in the air classifier is combined and delivered to a shredder where the size of the waste is further reduced. The output of the shredder is sent to a pellet mill, which compresses the waste and extrudes it into small pellets. To ensure that the pellets do not readily crumble, they are air cooled in a pellet cooler before storage.

DETAILED DESCRIPTION OF THE PREFERRED EMBODIMENT

The invention will now be described in detail with respect to a preferred embodiment in which it is adapted for recycling polystryene foam from restaurant waste. It should be understood that the invention can be used on any type of solid waste and is not limited to recovering polystyrene foam. For instance, the present invention can be adapted to recover any material having a fluidization velocity (as explained below) which distinguishes it from other waste with which it is mixed. For example, the present invention can readily be adapted to recover film plastic such as polyethylene and polyvinylchloride.

Figure 1:
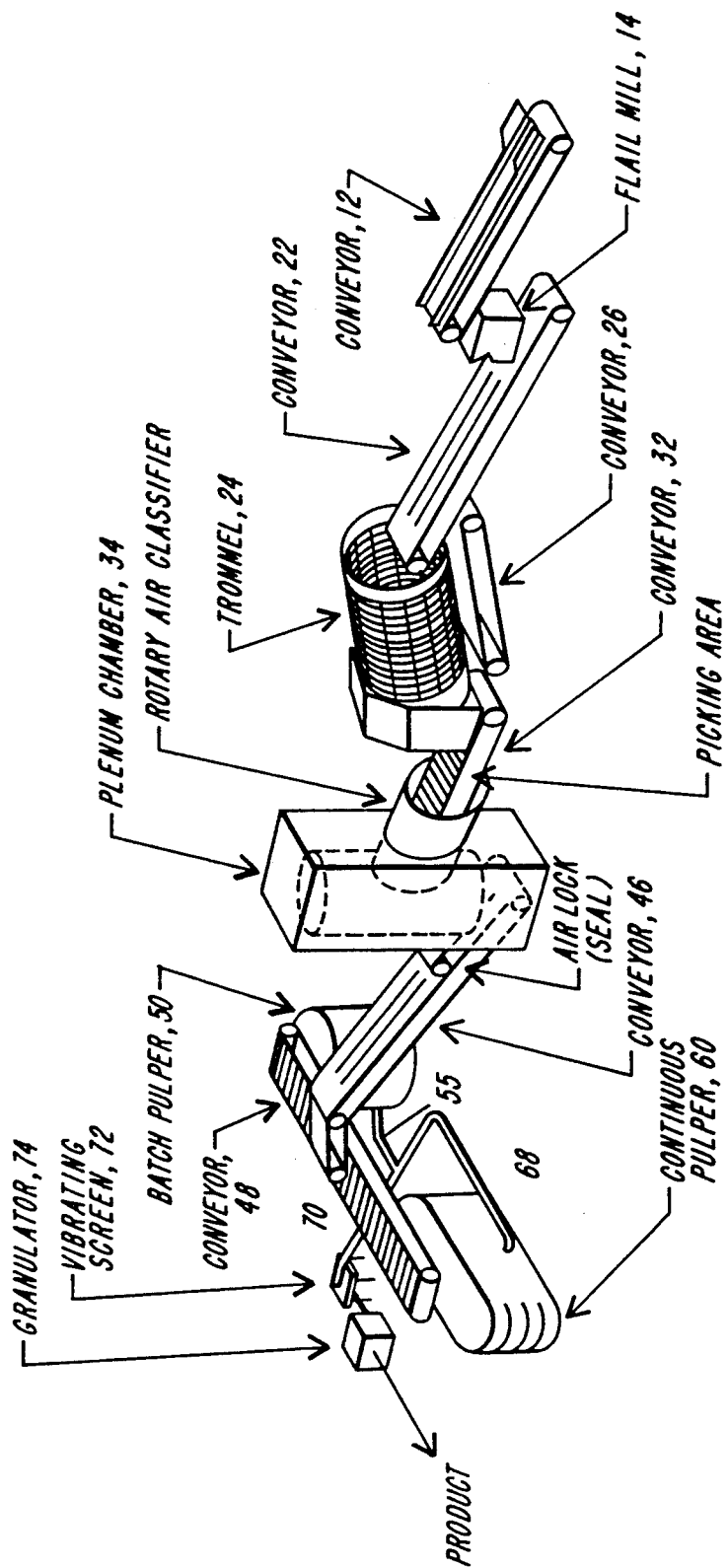
FIG. 1 is a pictorial diagram showing the primary line of the present apparatus.

FIG. 1 shows a diagram of the primary line of the PSF recycling process of the present invention. This particular embodiment is adapted to accept waste delivered to the recycling site in plastic garbage bags from fast food restaurants. In this embodiment, non-processable waste such as large metal objects are removed from the waste prior to processing. A front end loader (not shown) lifts the bags of waste onto conveyor belt 12. Conveyor belt 12 delivers a continuous stream of waste filled plastic garbage bags to flail mill 14.

Figure 3:
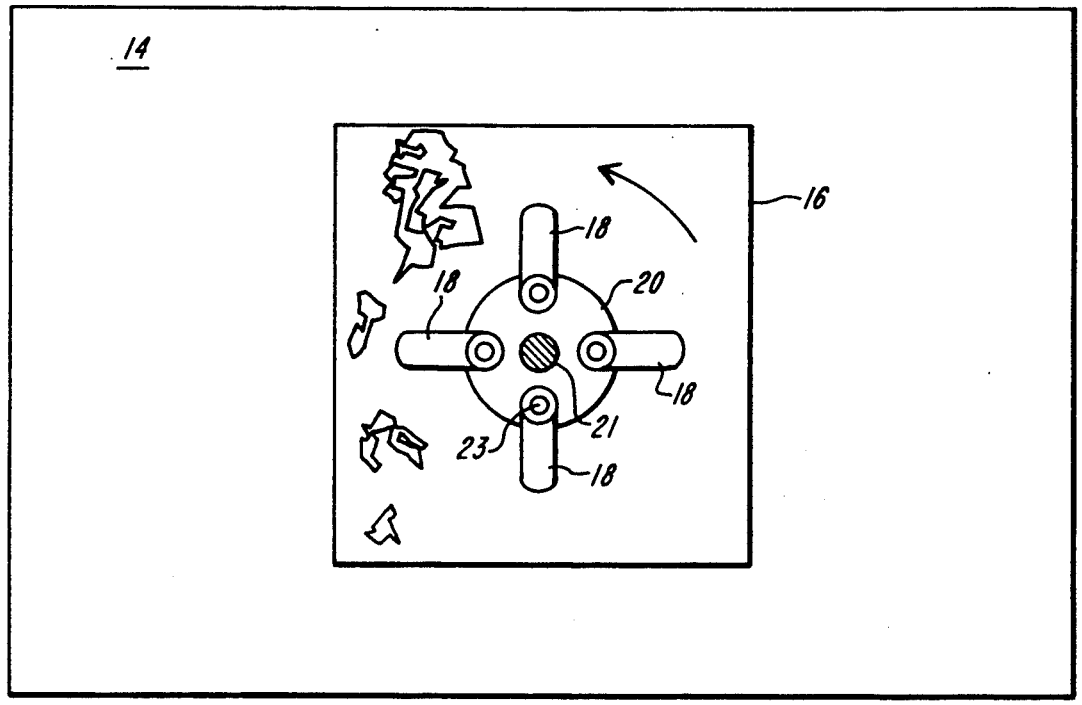
FIG. 3 is a simplified diagram of the flail mill of the present invention.

Flail mill 14 is illustrated in greater detail in FIG. 3. Such mills typically comprise a chamber 16 which is open at the top and a series of plates 20, each having a plurality of radially projecting hammers 18 extending therefrom. The plates in turn are mounted on a common shaft 21 which is suitably powered for rapid rotation. The hammers 18 are pivotally secured to the plates by pivots 23. In operation, the plastic bags drop off the end of conveyor 12 into the top of the chamber 16. As the internal plates, 20 rapidly turns, the hammers ar free to whip into the incoming plastic bags in a flailing type motion. The flail mill tears open the plastic liners releasing the waste within the garbage bags. The waste within the plastic bags from the cafeteria or fast food restaurant will typically comprise polystyrene containers and trays, condiment containers, eating utensils, paper cups, napkins, newsprint, wax cups, food and paper bags. Additionally, much of the waste will be further contained within paper bags which are in the plastic garbage bags. The hammers in the flail mill will also tear open the paper bags, thus releasing the waste therewithin. In addition to tearing open the plastic garbage bags and paper bags, flail mill 14 will tend to also cut the waste into a smaller size. Various types of flail mills are commercially available.

Figure 4:
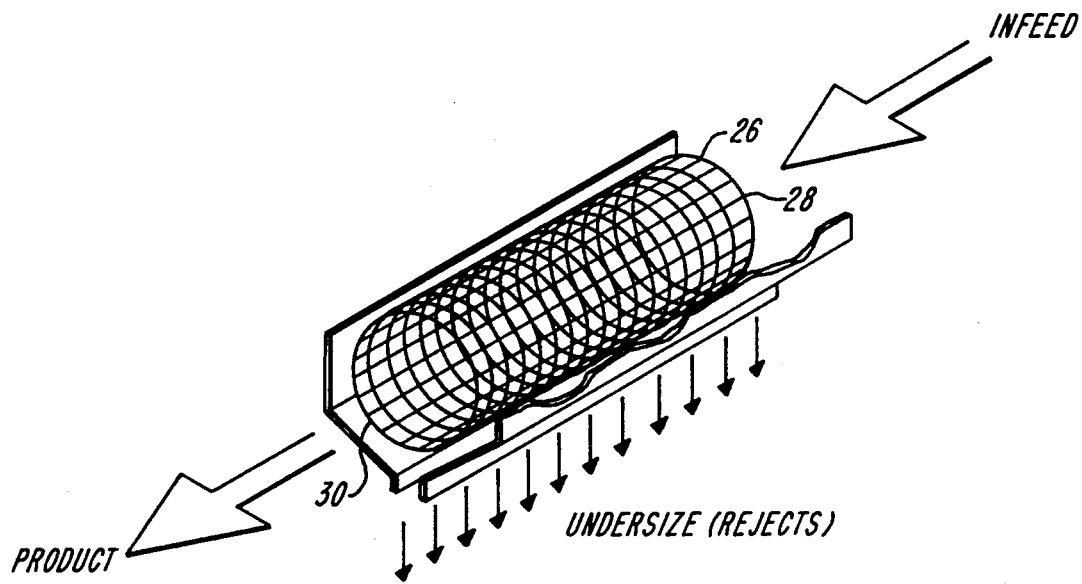
FIG. 4 is a diagram of the rotary trommel of the present invention.

The waste is discharged from the bottom of the flail mill 14 onto second conveyor belt 22. The waste stream is carried up conveyo 22 and dropped off the end into rotary trommel 24. Rotary trommel 24 is illustrated in FIG. 4. It comprises a cylindrical screen 26 which is rotated at a preset speed by a conventional drive such as a motor. In the preferred embodiment, the holes in the screen are 2"×4" inches. This size allows undersized materials, such as straws, utensils, food, and condiment containers to fall through the screen openings while PSF, napkins and other larger waste remains within the trommel 24. Different mesh sizes can be used depending on the nature of the waste and the material which it is wished to recover.

The input end 28 of the trommel 24 is elevated in relation to the output end 30 so that, as the trommel rotates, the force of gravity will advance the larger waste through the trommel and out of the output end 30. The smaller waste will fall through the screen onto conveyor 26 which will carry it toward the secondary line for processing as will be discussed shortly. The trommel 24 is rotated by a motor and chain drive mounted near the input end 28 of the trommel (not shown). In normal operation, the output of the trommel contains a high concentration of polystyrene foam. The undersized waste will include some amount of polystyrene foam, but typically in a relatively small proportion.

The waste output from output end 30 of the trommel drops onto conveyor 32 which carries it to air classification assembly 34. Air classification assembly 34 is illustrated in greater detail in FIG. 5. The air classification assembly 34 includes a rotary air classifier 36 which is essentially a rotating air chamber 35 with baffles 38 disposed on the inner surface of the chamber. The chamber 35 is suitably supported in journals or the like (not shown) for rapid rotation by a suitable and conventional drive. The drive may comprise a motor and suitable gear train. In a preferred embodiment, the rotary air classifier 36 is aligned at approximately a 12° angle from the horizontal with the input end 38 lower than the output end 40. Air is caused to flow from input end 38 to output end 40 in the chamber 35 by a blower fan (not shown). The air velocity in chamber 35 is chosen so as to be able to pick up and carry the polystyrene foam in the air stream from the input end 38 to the output end 40 while being unable to carry other materials such as wax coated cups and food. Any air velocity which would carry the polystyrene foam would also carry napkins and other paper products into the air stream.

Whether a waste particle is carried by the air stream or not is determined by the fluidization velocity of the particle. As explained in greater detail below, the fluidization velocity of a particle is the velocity of air required to lift the particle. Waste particles having a fluidization velocity (FV) less than the air velocity in chamber 35 will be picked up into the air stream and carried to the output end 40. Waste particles having a fluidization velocity greater than the air velocity in chamber 35 will not be picked up by the air stream. Fluidization velocity is defined as:

$$FV = \frac{2Mg}{C_d \cdot \rho \cdot a}$$

where, $FV$ = Fluidization velocity $M$ = Mass of the particle $g$ = Gravitational constant $C_d$ = Drug coefficint of the particle $\rho$ = Density of air $a$ = cross-section of the particle It can be seen from the above equation that the fluidization velocity of a waste particle depends on the mass, drag coefficient, and cross-section of the particle. It should be clear from the above equation that less dense particles generally are more likely to be carried by the air stream than more dense particles. However, as the equation illustrates, the fluidization velocity of a particle depends more accurately on the ratio of its mass to its cross-section and drag coefficient. In any event, those waste particle which would be picked up in the air stream in the rotary air classifier will hereinafter be referred to as low fluidization velocity particles (low FV) since they have a fluidization velocity less than the air velocity in chamber 35 and those waste particle which would not be picked up into the air stream in the rotary air classifier will hereinafter be referred to as high fluidization velocity particles (high FV) since they have a fluidization velocity equal to or greater than the air velocity in chamber 35.

Figure 5:
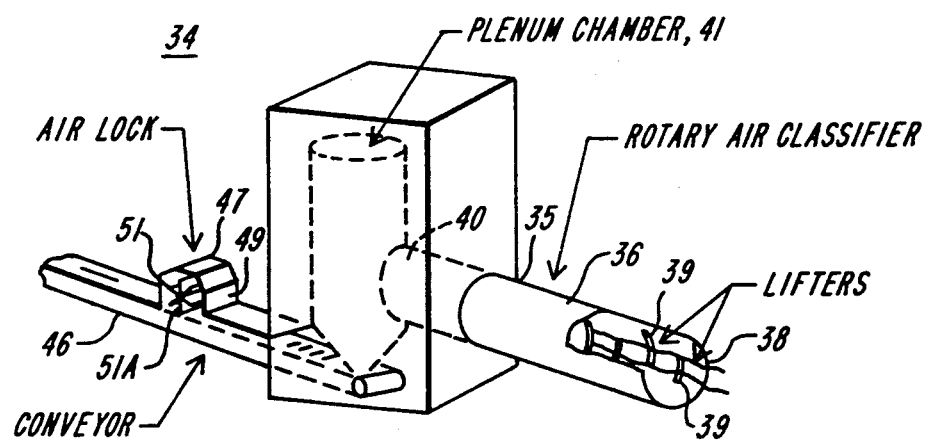
FIG. 5 is a diagram of the air classification assembly of the present invention.

As the rotary air classifier 36 is rotated, the baffles 39 tumble the waste exposing it to the air stream. In FIG. 5, the baffles are shown aligned perpendicular to the axis of the rotary air classifier. It should be understood that they may also be aligned parallel thereto.

The low FV particles such as polystyrene foam and napkins are lifted by the air stream and carried towards the output end 40. The high FV particles will remain in the chamber. Due to the slight incline of the air classifier 36 and the tumbling action of the lifters 38, gravity will cause the high FV particles to travel backwards towards the input end 38 and eventually drop from the rotary air classifier 36 onto conveyor 42, shown in FIG. 2.

The PSF rich stream of waste that exits output end 40 of the rotary air classifier 36 enters a plenum chamber 41 having a larger cross-section than the rotary air classifier 36. The velocity of the air stream is reduced in the plenum chamber 41 because of the increased cross-section, thereby causing the carried material (mostly polystyrene foam and napkins) to drop to the bottom of the plenum chamber. The bottom of the plenum chamber opens out onto conveyor belt 46.

The air assembly 34, including rotary air classifier 36 and plenum chamber 41, must be relatively airtight such that little or no air is lost from the fan through the air classifier 36, plenum chamber 41 and, optionally, a bag house for removing dust particles from the air prior to discharge into the atmosphere. On the other hand, the assembly cannot be entirely airtight since waste must enter and exit the air assembly 34. Air lock 47 allows conveyor 46 to transport waste from the air assembly while still maintaining a relatively airtight seal. Air lock 47 comprises a housing 49 which surrounds the conveyor belt 46 from the plenum chamber 41 to paddle wheel 51. This paddle wheel 51 forms an air lock to minimize the amount of air escaping through the housing 49. Paddle wheel 51 operates similarly to a revolving door. Paddle wheel 51 is fixed on a powered axis which is driven by suitable drive means to rotate at a specified speed such that the individual paddles, such as paddle 51A come into very close proximity with the conveyor belt 46. As waste travels along conveyor belt 46, it passes through paddle wheel 51 with a minimum loss of air. Alternately, paddle wheel 51 may be freely rotating such that it will rotate when a waste particle contacts the lowest paddle 51A. Further, the paddles of wheel 51 may actually contact conveyor belt 46 to provide an even better seal and to allow the conveyor belt to indirectly drive the paddle wheel to rotate.

Conveyor belt 46 continuously transports the stream of waste to a reversible conveyor belt 48. The reversible conveyor belt 48 can be set to deliver the PSF rich waste either to batch pulper 50 or continuous pulper 60 depending on its direction of motion. The waste remaining at this point, which is delivered to the pulpers, almost exclusively comprises paper and PSF. Either pulper mixes the PSF and paper with water and further reduces the size of the PSF particles to approximately ½"-1".

Figure 6:
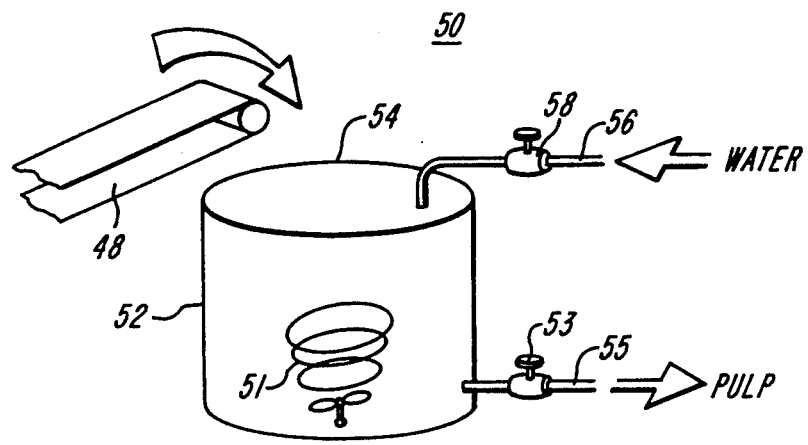
FIG. 6 is a diagram of the batch pulper of the present invention.

Referring now to FIG. 6, the batch pulper 50 is shown in greater detail. The batch pulper comprises a chamber 52, having an open top 54. The polystyrene rich waste from conveyor 48 is dumped into the top opening 54 of the chamber 52. After a specified amount of waste is dumped into the chamber, conveyor 48 is stopped. The batch pulper operates similarly to a household blender. After the waste is delivered to the batch pulper and the conveyor is stopped, water is added through pipe 56 and valve 58. Alternately, water may be added concurrently with the delivery of the waste. An agitator 51 is positioned at the bottom of the tank and is activated so as to agitate the water and waste mixture. The agitator 51 comprises a blade mounted on a shaft for rotating within the pulper 50. The shaft is suitably rotated by a motor. The agitator is designed to fiberize the paper into paper pulp and reduce the size of the PSF particles to approximately ½"-1". After a specified amount of time, the agitator is deactivated and the valve 53 is opened to allow the water/paper pulp/polystyrene mixture (hereinafter slurry) to be delivered through pipe 55 and on to further processing.

Figure 7:
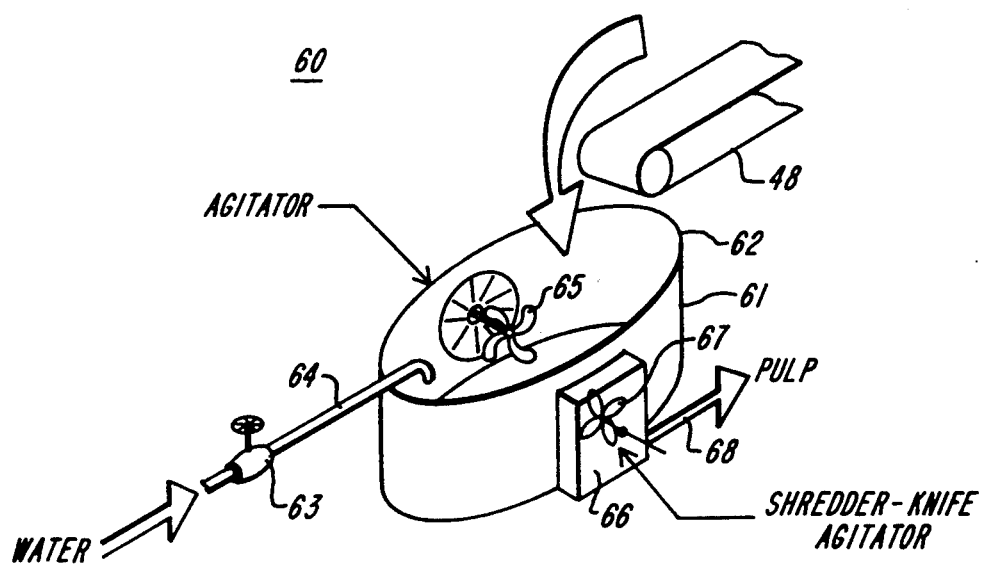
FIG. 7 is a diagram of the continuous pulper of the present invention.

Referring now to FIG. 7, the continuous pulper 60 is shown in greater detail. Continuous pulper 60 comprises a chamber 61 having an opening 62 at the top into which waste from conveyor 48 is dropped when the conveyor is set to deliver waste to the continuous pulper 60. The continuous pulper 60 is different from the batch pulper 50 in that it is designed to produce a slurry of paper pulp, water and polystyrene in a continuous stream. In normal operation, the tank is filled with slurry. Water is continuously fed into the pulper via valve 63 and pipe 64 while waste is continuously delivered from conveyor 48. At one side of the continuous pulper 60 is a powerful agitator 65. The agitator is in continuous operation and creates a vortex which pulls the slurry into its spinning blades. Agitator 65 shreds the polystyrene foam into particles of approximately ½"-1" in size and also fiberizes the paper. At the opp<site end of the tank is a screened plate 66 having a mesh sized to permit passage of particles having dimension which are less than set forth above. A second agitator 67 acts as a shear-shredder knife and also assures that the face of the screen 66 remains free of material so as to allow a continuous flow of slurry to exit the chamber 61 via pipe 68. This second agitator 67 is positioned at the inlet side of screen 66 with its blades close to the screen. It is suitably driven by means not shown.

Figure 8:
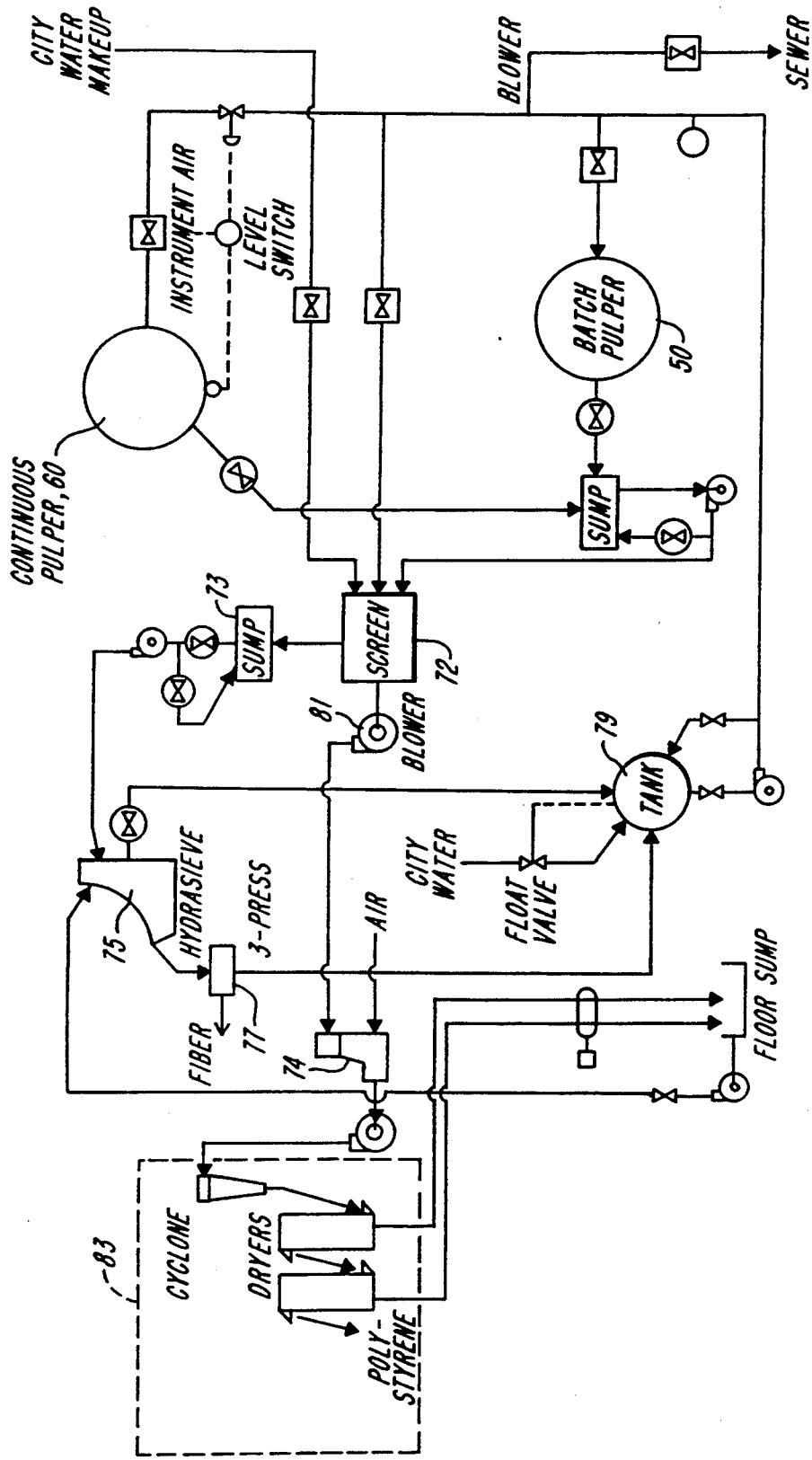
FIG. 8 is a diagram showing a schematic of the water recycling portion of the present invention.

Referring now to FIG. 8, the slurry outflow from batch pulper 52 through pipe 55 and from continuous pulper 60 through pipe 68 are both pumped through pipe 70 to a vibrating screen 72. The vibrating screen 72 washes and de-waters the polystyrene product. The mesh size of the screen is chosen to retain the ½" to 1" polystyrene particles while allowing the water and paper pulp to pass through. In a preferred embodiment, the mesh size of the vibrating screen is on the order of ⅛"-¼". An optional high pressure water spray may be added above the screen to clean and rinse the polystyrene foam and force the paper pulp through the screen.

The collected PSF particles on the screen are then air conveyed by a blower 81 to granulator 74 for further processing. The granulator 74 is a device that further reduces the maximum dimension of the polystyrene particles to less than a quarter of an inch by the action of rotating knives within a cylindrical chamber. The General Purpose 84-series granulator offered for sale by Cumberland Inc. is an example of a suitable granulator.

Figure 9:
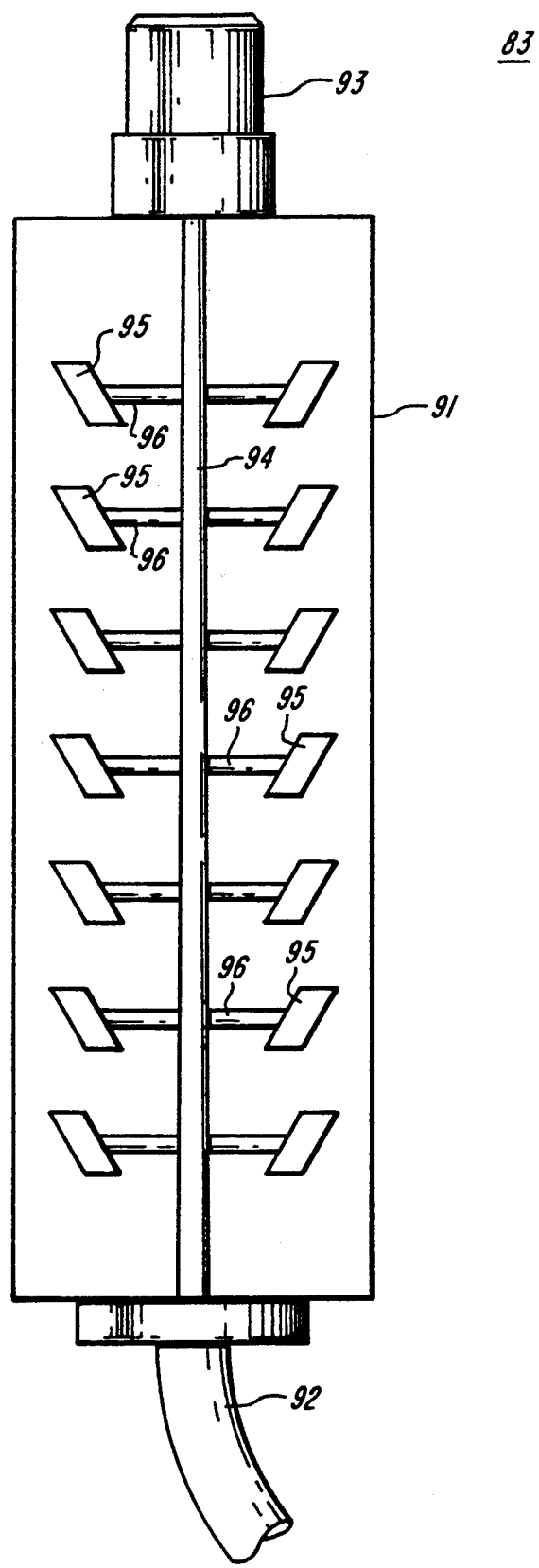
FIG. 9 is a pictorial diagram showing the dryer of the present invention.

The polystyrene foam may now be passed through a dryer 83 for final moisture separation. Various apparatus for drying plastic particles are commercially available. One such device is shown in FIG. 9 and comprises a vertically aligned cylindrical chamber 91 having an input feed 92 at the bottom and an output discharge 93 at the top. Within the cylindrical chamber is a central shaft 94 coupled to a drive means for rotating the shaft at high speeds. Attached to the shaft at various heights are a series of paddles 95 aligned at an angle to the horizontal. The paddles are mounted to the shaft by a series of arms 96. As the PSF particles are introduced from the bottom of the dryer, they are forced upward by an upward airflow caused by the rapid rotation of the paddles 95. The particles come in contact with the rapidly rotating paddles which essentially beat the surface water off of the PSF particles. The PSF particles eventually are carried upward by the airflow and the beating of the paddles to the output end of the dryer. The dried quarter inch size polystyrene foam particles output from the dryer are the final product and can be packaged and stored for shipment.

It is noted that waste which comprises primarily paper and polystyrene may be introduced to the apparatus at conveyor 46, subsequent to the flail mill, rotary trommel and air classification assembly. Alternately, if such waste will be the only waste provided to the apparatus, the initial stages including the flail mill, rotary trommel and air classification assembly may be eliminated from the overall apparatus. The stages of the preferred embodiment of the invention shown in FIG. 1 which are subsequent to the air classification assembly may be used not only for separating paper from polystyrene but also for cleaning and drying polystyrene. Thus, the present invention is not limited to the particular embodiment disclosed in the FIGS.

Figure 2:
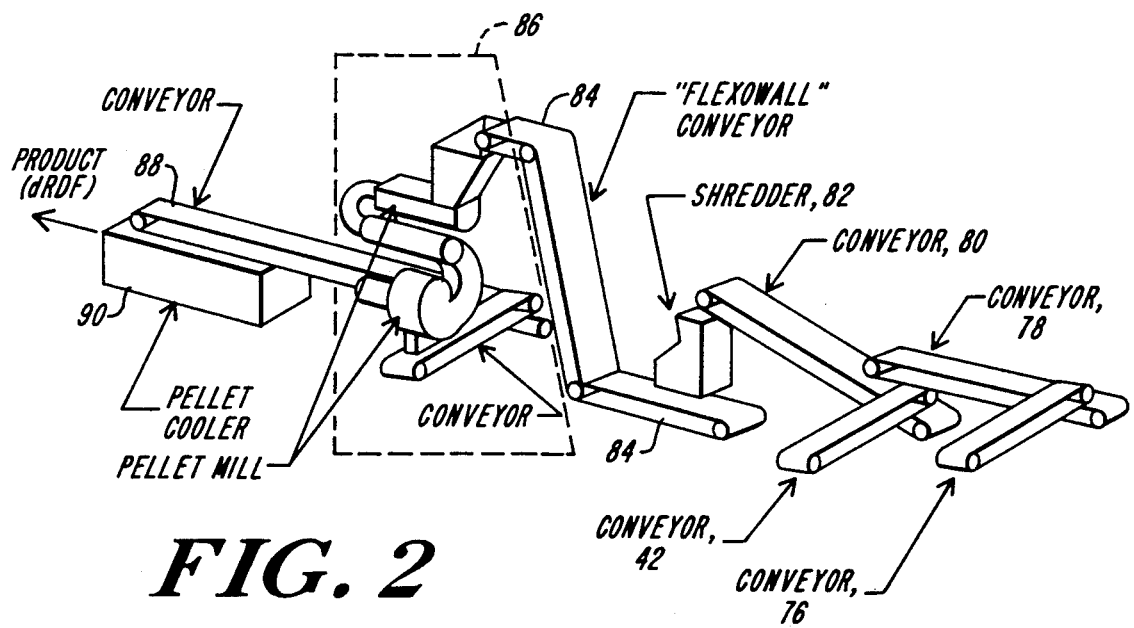
FIG. 2 is a pictorial diagram showing the secondary line of the present invention.

The present invention also provides means for recycling the undersized waste which is eliminated from the stream of waste by trommel 24 as well as the high FV waste which is eliminated in the rotary air classifier 36. As stated, the undersized waste from trommel 24 drops onto conveyor 26 and the high FV particles eliminated from the air stream in air classifier 36 drop onto conveyor 42. Referring to FIG. 2, undersized waste from conveyor 26 is further delivered to conveyor 76 and conveyor 76 delivers it to conveyor 78. The undersized waste on conveyor 78, as well as the air classifier high FV waste from conveyor 42 are both carried to a further conveyor 80.

Conveyor 30 transports the combined high FV waste and "undersized" waste to a secondary mechanical shredder 82. Secondary mechanical shredder 82 ma be similar to flail mill 14, comprising a chamber containing a series of rotating hammers. Secondary mechanical shredder 82, however, is designed to reduce the particle size to approximately ½" to 1" in size as opposed to the flail mill's 2" to 4" output particle size. Due to the fact that the secondary mechanical shredder is to reduce the waste particle size to approximately ¼ the size of the flail mill output, the secondary mechanical shredder 82 should be installed with more hammers than the flail mill. Otherwise, the secondary mechanical shredder 82 and the flail mill 14 can be quite similar in design. The secondary mechanical shredder ma also be equipped with a screen fit over the output end so as to ensure proper particle size reduction.

The secondary mechanical shredder 82 discharges its output onto conveyor 84 which is inclined at a very steep angle in order to save floor space. Conveyor 84 comprises a plurality of pockets for holding the waste particles securely during the steep incline. A "Flexowall" conveyor is one type conveyor suitable for steep inclines. The pellet mill receives the shredded waste, compresses it and extrudes it into small pellets. Pellet mills are well known in the prior art for creating densified refuse-derived-fuel (r-rdf) from waste and will not be described in detail. The output of the pellet mill 86 is deliver.d to conveyor 88 which further transports the pellets to pellet cooler 90. The pellets are air cooled in pellet cooler 90 in order to ensure that the pellets do not readily crumble. Pellet coolers are also well known in the prior art.

The present invention may also provide for recycling of the air used in the air classification assembly 34. The air flow through the air classifier is provided by a centrifugal fan. The fan pulls ambient air from the surrounding environment through the air classifier. In addition to picking up and carrying the light fraction of the waste, the air stream also picks up dust and carries it into plenum chamber 41. The majority of the light fraction (which comprises mostly polystyrene and paper) settles out of the air stream in the plenum chamber 41. However, much of the dust remains in the air flow and is carried through the plenum chamber to a bag house where the air is cleaned. The bag house is a chamber containing fabric filters in the form of large bags. The air flows through the bags which filter the dust out of the airflow. The cleaned air may be discharged to the atmosphere or may be recycled to the air classification assembly 34.

The water used in the pulpers is also recycled and the paper pulp recovered. A schematic of water and paper pulp flow through the apparatus of the present invention after the pulpers is shown in FIG. 8. The slurry (water and paper pulp) that passes through the vibrating screen 72 where the polystyrene is finally separated is collected and pumped by pump 73 to static sieve 75 for fiber/water separation. This device is a stationary screen having a mesh size selected to allow the water to drain through it while retaining the paper fiber. A pipe discharges the slurry onto the surface of the screen. The screen is slanted downwardly from the point where the pipe discharges the slurry onto the surface. The water drains through the screen while the pulp remains on top. The slant of the screen and the continuous flow of slurry onto the top of the screen constantly pushes the paper pulp on top of the screen towards the opposite, lower end of the screen. The HYDRASIEVE static sieves manufactured by C.E. Bauer, a division of Combustion Engineering Inc. of Springfield, Ohio is exemplary of the type of static sieve that may be used in the present invention. The partially dried paper pulp is forced off the end of the screen where it drops into a de-watering screw where more water is removed from the paper pulp.

The de-watering screw comprises a funnel shaped chamber having an auger-type screw rotating therein. The paper pulp drops into the funnel and the rotating scre forces the paper down into the funnel thereby compressing the paper pulp against itself and between the walls of the funnel and the chamber to squeeze water out of the pulp. The RSP 6 S-Press manufactured by Rietz Manufacturing Company of Santa Rosa, Calif. is exemplary of a de-watering screw which may be used in the present invention.

The water recovered at the static sieve and the de-watering screw is drained into tank 79 where it is recycled for use in the pulpers 50 and 60.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of recovering waste particles having a fluidization velocity less than a predefined fluidization velocity, said waste particles termed low FV particles, from a stream of waste, said stream of waste comprising low FV waste particles mixed with other types of waste including wast particles having a fluidization velocity greater than said predefined fluidization velocity termed high FV particles, said method comprising the steps of;
   a. reducing the waste to particle sizes within a first range of sizes,
   b. subjecting the stream of waste particles to an air stream having a velocity sufficient to carry low FV particles while high FV particles are not carried by and are thereby eliminated from the stream of waste particles,
   c. mixing the stream of waste particles with water,
   d. agitating the mixture to fiberize any paper particle waste therein contained, and
   e. removing the fiberized particles and water from the stream.

2. A method as set forth in claim 1 wherein said low FV waste is a foamed plastic.

3. A method as set forth in claim 2 wherein said foamed plastic is polystyrene foam.

4. A method as set forth in claim 3 wherein step (a) comprises the steps of
   shredding said waste to reduce the waste particles size to a predefined maximum size, and
   passing the stream of waste particles over a screen having openings sized to remove waste particles smaller than a predefined minimum size.

5. A method as set forth in claim 4 wherein said screen is formed into a cylindrical trommel and said trommel rotates as said waste particles pass through.

6. A method as set forth in claim 1 wherein said stream of waste comprises plastic bags within which waste particles are contained and wherein the step of shredding said waste tears open said plastic bags and liberates waste particles contained within said plastic bags.

7. A method as set forth in claim 6 further comprising the step of removing said plastic bags from the stream of waste directly after said shredding step.

8. A method as set forth in claim 7 wherein waste particles which are removed from said stream of waste in steps a and b are formed into densified refuse-derived-fuel.

9. A method as set forth in claim 8 wherein the process of forming said refuse derived fuel comprises the steps of;
   combining the removed waste from steps a and b to form a secondary stream of waste,
   shredding said secondary stream of waste to produce secondary waste particles of a second predefined size range,
   compressing said secondary waste particles,
   extruding said compressed waste particles into pellets, and
   cooling said pellets.

10. A method as set forth in claim 9 further comprising the step of de-watering the removed fiberized particles from step e to produce paper pulp.

11. A method of recovering foamed polystyrene waste particles from a source of waste particles primarily comprising paper products, wax coated paper products and foamed polystyrene, comprising the steps of;
   a. shredding said waste so as to reduce the size of the particles of said waste to a first predefined maximum particle size and to open any bags in said waste stream,
   b. delivering said waste to a rotary trommel having openings of a second specified size so as to remove waste particles which are smaller than a second specified size from the waste stream,
   c. introducing said waste to an air chamber having an air flow velocity therein that will cause waste particles having a fluidization velocity below a specified fluidization velocity to be carried through said chamber by said air flow while waste particles having a higher fluidization velocity than said specified fluidization velocity are not carried by said air flow, said fluidization velocity being higher than the fluidization velocity of foamed polystyrene, d. introducing the waste which passes thorugh said chamber into a mixing vat, e. mixing said waste particles with water, and f. passing the mixture through a screen of a specified mesh size that will allow water and paper pulp to pass through while retaining the foamed polystyrene particles.

12. A method as set forth in claim 11 further comprising the step of agitating said mixture before passing it through said screen so as to facilitate the breakdown of the paper in said mixture to paper pulp and to cleanse the foamed polystyrene.

13. A method as set forth in claim 12 wherein said waste includes plastic liners and further comprising the step of removing said plastic liners from the stream of waste between step b and c.

14. A method as set forth in claim 13 wherein the stream of waste primarily comprises paper products, plastic eating utensils, wax coated paper products and foamed polystyrene products.

15. A method as set forth in cliam 14 wherein waste particles which are removed from said stream of waste in steps a and c are combined and formed into densified refuse derived fuel.

16. A method as set forth in claim 15 further comprising the step of de-watering the removed paper pulp from step f.

17. A method as set forth in claim 16 further comprising the steps of;

passing the water and paper pulp through a sieve to separate said water from said paper pulp, and recovering said water for use again in step e.

18. An apparatus for recovering foamed polystyrene from waste, said waste comprising foamed polystyrene waste particles mixed with other types of waste particles said apparatus comprising:

means for conveying a continuous stream of waste through said apparatus, means for reducing the size of said foamed polystyrene and other waste particles to a first predetermined size range and to tear open any baqs in which waste particles may be contained at an initial station along said stream, means for removing from said stream of reduced particles, particles that have a higher fluidization velocity than a specified fluidization velocity, means for mixing said waste with water to fiberize any paper remaining in said waste stream after remcval of said hiqh fluidization velocity particles, and means for separating said foamed polystyrene particles from said waste stream after fiberization of paper in said stream.

19. An apparatus as set forth in cliam 18 wherein said means for reducing comprises, means for shredding said waste, and means for eliminating from said waste stream waste particles smaller than a first predefined size.

20. An apparatus as set forth in claim 19 wherein said means for shredding comprises a flail mill having a chamber into which said waste is delivered, and a plurality of rotating hammers for contacting and shredding said waste.

21. An apparatus as set forth in claim 20 wherein said means for eliminating comprises a rotating, cylindrical trommel constructed of a screen having holes of said first predefined size.

22. An apparatus as set forth in claim 21 wherein said screen is vibrated.

23. An apparatus as set forth in claim 20 wherein said means for removing hiqh fluidization velocity waste particles comprises an air classifier having, a cylindrical air chamber aliqned on an incline and having a lower end for accepting waste and an upper end for discharqing waste, means for forcing air throuqh said chamber towards said upper end at a velocity that will carry waste particles having a fluidization velocity less than said specified fluidizaton velocity throuqh said chamber yet allow waste particles having a hiqher fluidization velocity than said specified fluidization velocity to settle in said chamber, the incline of said chamber assisting said settled waste to fall out of said lower end of said air chamber and s id specified fluidization velocity being qreater than the fluidizaton velocity of said foamed polystyrene particles.

24. An apparatus as set forth in claim 23 wherein said air classifier further comprises, means for rotating said air chamber, baffles disposed on the inner wall of said chamber to contact the waste particles and expose them to the air stream.

25. An apparatus as set forth in claim 24 wherein said air classifier further comprises a plenum chamber coupled to receive waste particles from the upper end of said air classifier, said plenum chamber having a cross-section larqer than said air classifier so as to reduce the velocity of the air to a velocity that allows the carried waste particles to settle to the bottom of said plenum chamber.

26. An apparatus as set forth in claim 18 further comprising means for agitating said waste/water mixture before passing through said screen so as to assist in the fiberization of said paper.

27. An apparatus as set forth in claim 18 wherein said means for mixing said waste with water comprises a batch pulper including a mixing chamber, means for delivering a specified amount of waste from said air classifier, means for introducing water into said mixing chamber, an agitator for mixing said waste and water, and means for pumping said mixture towards said screen.

28. An apparatus as set forth in claim 27 wherein said means for delivering comprises a conveyor belt.

29. An apparatus as set forth in claim 18 wherein said means for mixing said waste with water comprises a continuous pulper including, means for continuously delivering said waste from said air classifier to said mixing chamber, means for continuously delivering water to said mixing chamber, and an agitator in said chamber for shredding said waste and forcing the mixture toward said output end.

30. An apparatus as set forth in claim 29 further comprising, means for receiving and transporting said waste particles smaller than said first predefined size, means for receiving and transporting said high fluidization velocity waste particles, means for mixing said high fluidization velocity waste particles with said smaller waste, and means for pelletizing said mixed waste to produce densified refuse-derived-fuel.

31. An apparatus as set forth in claim 30 wherein said means for receiving and transporting comprise conveyor belts.

32. An apparatus as set forth in claim 18 further comprising a sieve coupled to receive the water and paper which passes through said means for separating said waste stream after fiberization, said sieve comprising a mesh of a size sufficient to separate said water from said paper pulp, and means coupled to receive said water through said sieve, and emans for pumping said water from said means to receive back into said means for mixing.

33. An apparatus a set forth in claim 18 wherein said means for separating said waste stream after fiberization comprises a screen having a mesh size which will allow water and paper pulp to pass through and retain foamed polystryene particles.

34. A method of separating foam plastic waste from a quantity of mixed waste which may include paper, waxed paper, food, plastic utensils, bags, cups and plates comprising the steps of;

entraining said waste intoa stream of waste, sequentially treating said waste stream at a series of stations to reduce the waste stream to particles within a predetermined range of sizes, thereafter removing all but light weight particles including sai foam plastic from the stream by directly blowing air through the stream by means of an air current which continues to carry only the light weight particles in the stream, thereafter fiberizing the light weight particles other than the foam plastic in a water matrix, and separating the foam plastic particles therefrom.

* * * * *